US008458033B2

(12) United States Patent
Graham (10) Patent No.: US 8,458,033 B2
(45) Date of Patent: Jun. 4, 2013

(54) DETERMINING THE RELEVANCE OF OFFERS

(75) Inventor: Paul Graham, Cambridge, MA (US)

(73) Assignee: Dropbox, Inc., San Francisco, CA (US)

( * ) Notice: Subject to any disclaimer, the term of this patent is extended or adjusted under 35 U.S.C. 154(b) by 2479 days.

(21) Appl. No.: 10/639,811

(22) Filed: Aug. 11, 2003

(65) Prior Publication Data

US 2005/0038893 A1    Feb. 17, 2005

(51) Int. Cl.
    *G06F 17/00*    (2006.01)
(52) U.S. Cl.
    USPC ...................................................... 705/14.52
(58) Field of Classification Search
    USPC ............... 705/14, 14.43, 14.49, 14.52, 14.66
    See application file for complete search history.

(56) References Cited

U.S. PATENT DOCUMENTS

| 4,775,935 | A |   | 10/1988 | Yourick ...................... 364/401 |
| 4,833,308 | A |   | 5/1989  | Humble ...................... 235/383 |
| 5,155,591 | A |   | 10/1992 | Wachob ........................ 358/86 |
| 5,401,946 | A |   | 3/1995  | Weinblatt .................... 235/381 |
| 5,592,560 | A |   | 1/1997  | Deaton et al. ................ 382/100 |
| 5,636,346 | A |   | 6/1997  | Saxe ............................. 395/201 |
| 5,677,853 | A |   | 10/1997 | Tracy ........................... 364/554 |
| 5,710,884 | A |   | 1/1998  | Dedrick .................. 395/200.47 |
| 5,710,887 | A |   | 1/1998  | Chelliah et al. ............. 395/226 |
| 5,717,923 | A | * | 2/1998  | Dedrick ........................ 707/102 |
| 5,721,827 | A |   | 2/1998  | Logan et al. ............ 395/200.47 |
| 5,724,521 | A |   | 3/1998  | Dedrick ........................ 395/226 |
| 5,740,549 | A |   | 4/1998  | Reilly et al. ................... 705/14 |
| 5,774,170 | A |   | 6/1998  | Hite et al. ........................ 348/9 |
| 5,790,426 | A |   | 8/1998  | Robinson ...................... 364/554 |
| 5,848,396 | A |   | 12/1998 | Gerace ............................ 705/10 |
| 5,855,482 | A |   | 1/1999  | Remer .......................... 434/238 |
| 5,867,799 | A |   | 2/1999  | Lang et al. ....................... 707/1 |
| 5,915,243 | A |   | 6/1999  | Smolen .......................... 705/14 |
| 5,918,014 | A |   | 6/1999  | Robinson ................. 395/200.49 |
| 5,933,811 | A |   | 8/1999  | Angles et al. .................. 705/14 |
| 5,948,061 | A |   | 9/1999  | Merriman et al. ............ 709/219 |
| 5,959,623 | A |   | 9/1999  | van Hoff et al. .............. 345/333 |
| 5,983,214 | A |   | 11/1999 | Lang et al. ....................... 707/1 |
| 6,009,410 | A |   | 12/1999 | LeMole et al. ................. 705/14 |
| 6,026,370 | A |   | 2/2000  | Jermyn .......................... 705/14 |
| 6,041,311 | A |   | 3/2000  | Chislenko et al. ............. 705/27 |
| 6,044,376 | A |   | 3/2000  | Kurtzman, II ................ 707/102 |
| 6,112,186 | A |   | 8/2000  | Bergh et al. .................... 705/10 |
| 6,119,098 | A |   | 9/2000  | Guyot et al. .................... 705/14 |
| 6,134,532 | A | * | 10/2000 | Lazarus et al. ................. 705/14 |

(Continued)

OTHER PUBLICATIONS

"Cisco Unveils Next Phase of Cisco 7000 Family of Internet Routers" [online]. [Retrieved on Jul. 22, 2003]. Retrieved from the Internet: http://www.tmcnet.com/enews/091201a.htm.

(Continued)

*Primary Examiner* — James W Myhre
*Assistant Examiner* — Michael Goldman
(74) *Attorney, Agent, or Firm* — Novak Druce Connolly Bove + Quigg LLP (57) ABSTRACT

Offers are targeted to consumers by comparing offer profiles and consumer profiles. Offer profiles are created by analyzing the cumulative content of communications associated with consumers who respond to the offers. Consumer profiles are created by analyzing the cumulative content of communications associated with a user of an electronic communications system. An offer may be selected to be sent to a user based on the relative similarity between the user's consumer profile and the offer profile.

18 Claims, 6 Drawing Sheets

U.S. PATENT DOCUMENTS

| | | | | |
|---|---|---|---|---|
| 6,144,944 | A | 11/2000 | Kurtzman, II et al. | 705/14 |
| 6,157,921 | A * | 12/2000 | Barnhill | 706/16 |
| 6,183,366 | B1 * | 2/2001 | Goldberg et al. | 463/42 |
| 6,195,657 | B1 | 2/2001 | Rucker et al. | 707/5 |
| 6,216,129 | B1 | 4/2001 | Eldering | 707/10 |
| 6,236,978 | B1 | 5/2001 | Tuzhilin | 705/26 |
| 6,256,633 | B1 | 7/2001 | Dharap | 707/10 |
| 6,298,228 | B1 | 10/2001 | Singh | 455/403 |
| 6,298,348 | B1 | 10/2001 | Eldering | 707/10 |
| 6,308,175 | B1 | 10/2001 | Lang et al. | 707/10 |
| 6,324,519 | B1 | 11/2001 | Eldering | 705/14 |
| 6,327,574 | B1 | 12/2001 | Kramer et al. | 705/14 |
| 6,334,127 | B1 | 12/2001 | Bieganski et al. | 707/5 |
| 6,339,761 | B1 | 1/2002 | Cottingham | 705/14 |
| 6,345,293 | B1 | 2/2002 | Chaddha | 709/219 |
| 6,356,879 | B2 | 3/2002 | Aggarwal et al. | 705/26 |
| 6,370,514 | B1 | 4/2002 | Messner | 705/14 |
| 6,370,526 | B1 | 4/2002 | Agrawal et al. | 707/5 |
| 6,385,592 | B1 | 5/2002 | Angles et al. | 705/14 |
| 6,460,036 | B1 | 10/2002 | Herz | 707/10 |
| 6,480,885 | B1 | 11/2002 | Olivier | 709/207 |
| 6,484,148 | B1 | 11/2002 | Boyd | 705/14 |
| 6,487,539 | B1 | 11/2002 | Aggarwal et al. | 705/14 |
| 6,513,052 | B1 | 1/2003 | Binder | 707/204 |
| 6,519,571 | B1 | 2/2003 | Guheen et al. | 705/14 |
| 6,560,578 | B2 * | 5/2003 | Eldering | 705/14 |
| 6,631,372 | B1 * | 10/2003 | Graham | 707/5 |
| 6,836,773 | B2 * | 12/2004 | Tamayo et al. | 707/6 |
| 6,968,333 | B2 * | 11/2005 | Abbott et al. | 707/3 |
| 7,062,510 | B1 * | 6/2006 | Eldering | 707/104.1 |
| 7,113,917 | B2 * | 9/2006 | Jacobi et al. | 705/14 |
| 7,149,704 | B2 * | 12/2006 | Martin et al. | 705/10 |
| 7,158,943 | B2 * | 1/2007 | van der Riet | 705/14 |
| 7,174,305 | B2 * | 2/2007 | Carruthers et al. | 705/14 |
| 7,181,438 | B1 * | 2/2007 | Szabo | 707/2 |
| 7,272,573 | B2 * | 9/2007 | Childs et al. | 705/26.1 |
| 7,386,439 | B1 * | 6/2008 | Charnock et al. | 704/9 |
| 2002/0042739 | A1 | 4/2002 | Srinivasan et al. | 705/14 |
| 2002/0049704 | A1 * | 4/2002 | Vanderveldt et al. | 707/1 |
| 2002/0059574 | A1 | 5/2002 | Tudor et al. | 725/1 |
| 2002/0062368 | A1 | 5/2002 | Holtzman et al. | 709/224 |
| 2002/0065802 | A1 * | 5/2002 | Uchiyama | 707/1 |
| 2002/0099730 | A1 | 7/2002 | Brown et al. | 707/500 |
| 2002/0107853 | A1 | 8/2002 | Hofmann et al. | 707/7 |
| 2002/0130902 | A1 | 9/2002 | Shaouy et al. | 345/745 |
| 2002/0133404 | A1 | 9/2002 | Pedersen | 705/14 |
| 2002/0161664 | A1 | 10/2002 | Shaya et al. | 705/26 |
| 2002/0186867 | A1 | 12/2002 | Gutta et al. | 382/116 |
| 2002/0198882 | A1 | 12/2002 | Linden et al. | 707/10 |
| 2003/0037041 | A1 | 2/2003 | Hertz | 707/1 |
| 2003/0158777 | A1 * | 8/2003 | Schiff et al. | 705/14 |

OTHER PUBLICATIONS

"CYBERsitter Spam Manager Introduction and Overview of Operations" [online]. Retrieved from the Internet: http://www.noxmail.com/imail/spammanagerimail.pdf.

Hinton, Craig, "iCognito PureSight," *SC Magazine*, Mar. 2003. Retrieved from the internet: http://www.incognito.com/pdf/sc_puresight_bestbuy.pdf.

"Microlanguage Technology" [online]. [Retrieved on Jul. 22, 2003]. Retrieved from the Internet: http://www.microlanguage.com/prod_technology.html.

"Technology Introduction" [online]. [Retrieved on Apr. 22, 2003 and May 9, 2003]. Retrieved from the Internet: http://www.automony.com/Content/Technology/.

* cited by examiner

DETERMINING THE RELEVANCE OF OFFERS

TECHNICAL FIELD

The invention generally relates to profiling offers and consumers, and using the profiles to determine or predict the relevance of the offers to consumers.

BACKGROUND INFORMATION

Merchants use various statistical methods and models in an attempt to maximize the effectiveness of offers sent to consumers. Certain of such methods and models attempt to predict the likelihood that a given consumer or a set of consumers will respond favorably to a particular offer based on various geographic and demographic characteristics of the consumer. Other models look at historical purchase or payment data of current customers to predict follow-on behavior such as the current customer's future purchases or payment behavior.

In general, the accuracy of any model is dependent on the amount, relevancy, and quality of the input data. A model that includes every piece of information about a person and all their actions could make very accurate predictions regarding the future behaviors of that person. However, the amount of computing resources, data, and time needed to create an all-inclusive model makes such a system cost prohibitive to build and to maintain. In contrast, "mass mailings" tend to have minimal up-front modeling costs because offers are sent out with little or no regard to the recipients. However, this approach can have success rates (number of purchases/number of offers sent) of less than 1%, and thus generally are not effective. Sending such a large volume of offers that are ultimately never acted upon can cost a significant amount of money, and produces minimal returns. In addition to the two extreme approaches described above, other methods attempt to achieve an economic balance between maximizing offer success rates and minimizing the complexity, and thus the cost, of the predictive models.

One approach is the use of "marketing databases." In general, marketing databases store information about current and/or potential customers. Such information can include data regarding a customer's previous purchases, customer service interactions, promotions received by a customer, geographic data, and demographic data. As the database accumulates more information about current customers, merchants can build models with predictive features, including determining which consumers are more likely to respond to certain offers in a positive fashion. Another approach is collaborative filtering, where a merchant compares prior purchases of one consumer to the prior purchases of another consumers. When the one consumer revisits the merchant (for example, in person, on the World Wide Web, or by receiving a catalog) the merchant presents the one consumer with offers for products or services purchased by the other consumers who have purchase histories similar to those of the one customer. This approach requires that the merchant have some historical purchase information about the one consumer.

Merchants also track the behavior of web site visitors by assigning each user a unique identifier which can then be kept in the URL as the visitor visits other pages of the site or stored as a "cookie" file in the browser. By this means, merchants and advertisers can track the pages viewed and the products purchased of each user. Thus, the operator may target ads, offers, or content accordingly. This approach is also based on a consumer's previous interactions with the merchant.

SUMMARY OF THE INVENTION

Merchants can use information about a consumer's historical purchases in concert with generally available demographic data, but even such combinations do not allow the prediction with accuracy of the behavior of a consumer who has no prior interaction with the merchant.

Electronic communications companies provide a multitude of services to consumers and merchants such as Internet access, delivery of text and graphical content, web-based electronic mail ("email"), and instant messaging. Furthermore, these same companies provide merchant services such as advertisement development, content and application hosting, distribution of offers to members of the general public, and access to advertisement space on content pages and emails. By providing these services, the electronic communication companies have access to large amounts of communications sent to and from both their users as well as members of the general public, manage the delivery of electronic offers from merchants to general visitors to their sites, and track which visitors select particular advertisements. This large volume of data offers a significant opportunity to classify, analyze, and score the content of communications based on the actions of particular users in order to better predict the effectiveness of offers without requiring an initial interaction between the consumer and the merchants making the offers.

The invention relates to methods and systems for assessing the relevance of an offer to be presented to a consumer by applying profiling and classification methods to the content of communications among consumers. More particularly, the invention relates to targeting offers accurately to consumers by creating offer profiles based on the content of various communications associated with consumers who have responded to the offers but whose communications do not contain any reference to or information about the offers, creating consumer profiles based on the cumulative content of the communications associated with consumers, comparing a consumer's consumer profile to a set of offer profiles, determining an offer profile that tends to match the consumer's consumer profile, and delivering the offer associated with that profile to that consumer.

In one aspect, the invention relates to a method of determining the relevance of offers to consumers. The method comprises providing a plurality of offer profiles, each of which is associated with an offer and based at least in part on the content of at least one communication which is unrelated to the offer. Furthermore, the method comprises providing a plurality of consumer profiles. Each consumer profile is associated with a consumer and based on the content of at least one communication associated with the consumer. In addition, the method determines the relevance of one of the offers to one of the consumers by comparing the offer profile associated with that offer to the consumer profile associated with that consumer.

Prior to providing the offer profiles, the offers can be sent to at least one consumer. The at least one communication unrelated to the offer can be associated with the at least one consumer. Information about a consumer's responses to one the offers can be received. The offer profiles can be based, in part, on the information received about the response of one of the consumers to one of the offers, and a weight can be given to at least one communication unrelated to the offer based on the information received about the response of one of the consumers to one of the offers. At least one of the offers may be an advertisement. At least one of the communications unrelated to the offer can be an electronic communication. The electronic communication can be one or more of an electronic mail message, an instant message, or a voice message. At least one of the communications associated with a consumer can be an electronic communication. The electronic communication associated with a consumer can be one or more of an electronic mail message, an instant message, or a voice message.

Another aspect of the invention features a system for determining the relevance of offers to users of an electronic communications system. The system includes a first profiler for determining an offer profile for an offer based at least in part on the content of at least one communication unrelated to the offer. The system also includes a second profiler for determining a consumer profile for a user of the electronic communications system based at least in part on the content of electronic communications associated with the user of the electronic communications system. Furthermore, the system includes a comparison engine for comparing the offer profile to the consumer profile to determine the relevance of the offer to the user.

The system can include a delivery engine for delivering one or more offers to the users of the electronic communications system. The system can include a receiver for receiving information about at least one response by a user of the electronic communications system to the one or more offers delivered to the user of the electronic communications system. The first profiler may assign a weight to a communication unrelated to the offer based on the information about a response by a user of the electronic communications system to the one or more offers delivered to the user of the electronic communications system. The system may further include a database server for storing at least one of the offer, the offer profile, the consumer profile, the information about a response by a user of the electronic communications system to the one or more offers delivered to the user of the electronic communications system, and the electronic communication. The system may also include a communications server for facilitating communications among the users of the electronic communications system. In some versions of the invention, the first and second profilers are implemented as one software component.

Another aspect of the invention relates to a method of creating an offer profile. The method comprises associating with an offer at least one consumer communication unrelated to the offer. The method further comprises creating a profile for the offer based at least in part on the content of the at least one consumer communication unrelated to the offer.

The offer can be an advertisement. Prior to associating with an offer at least one consumer communication unrelated to the offer, the offer can be sent to at least one consumer. The at least one consumer communication can be associated with the at least one consumer. Prior to associating with an offer at least one consumer communication unrelated to the offer, information about a response to the offer by a consumer may be received. The offer profile can be based, at least in part, on the information received about a response to the offer by a consumer, and a weight may be given to at least one consumer communication unrelated to the offer based on the information received about a response to the offer by a consumer.

Yet another aspect of the invention relates to a method of creating a consumer profile. The method comprises assigning communications between two or more consumers to at least one of the two or more consumers. The method further comprises creating a consumer profile for at least one of the two or more consumers based at least in part on the content of the communications assigned to the at least one of the two or more consumers. The communications between two or more consumers can be electronic communications. Furthermore, the electronic communications can be one or more of an electronic mail message, an instant message, or a voice message.

The foregoing and other objects, aspects, features, and advantages of the invention will become more apparent from the following description and from the claims.

DESCRIPTION

Figure 1:
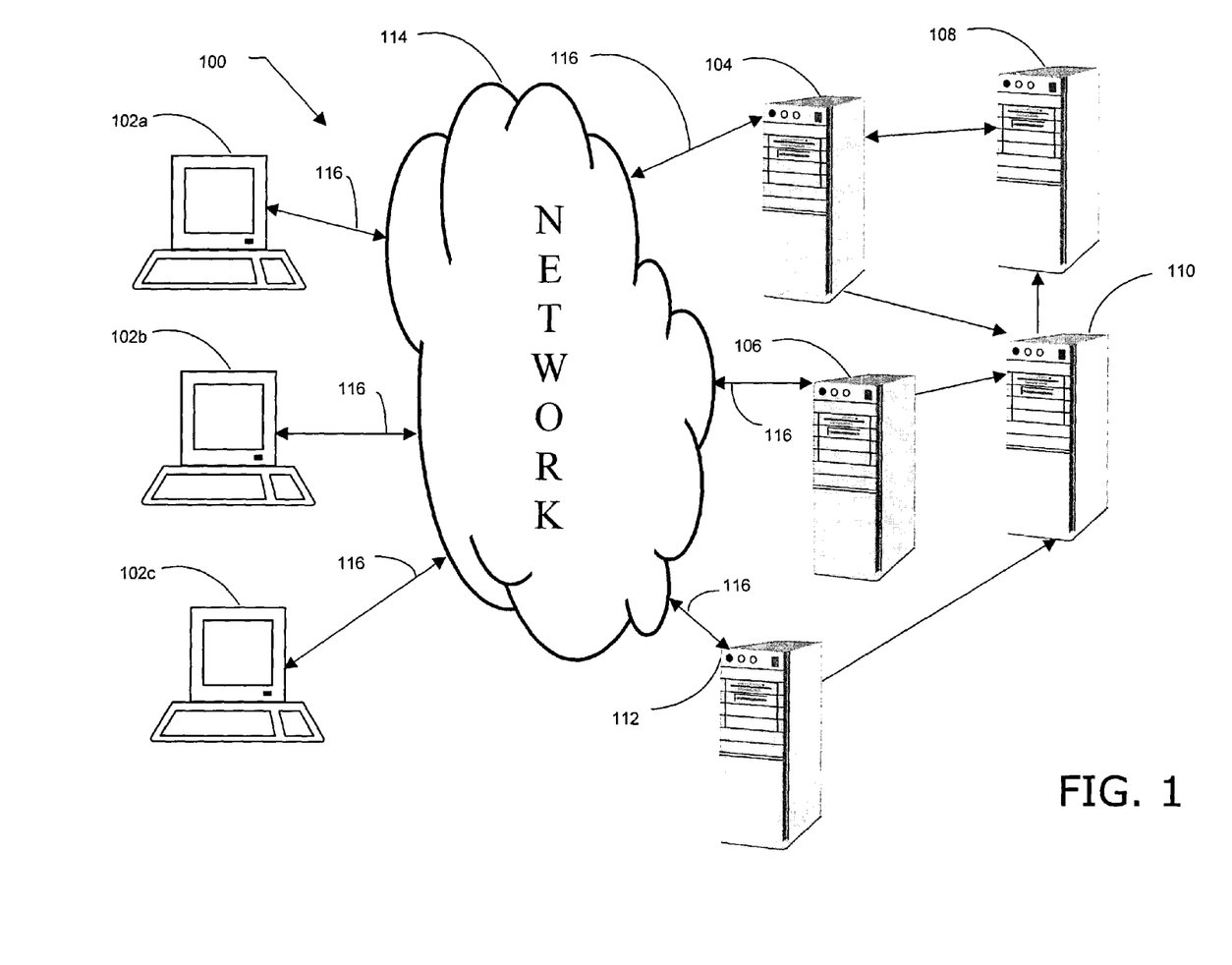
FIG. 1 is a diagram of an environment in which embodiments of the invention can operate.

In FIG. 1, an environment 100 in which embodiments of the invention can operate to facilitate the delivery of offers to users of an electronic communications system by comparing offer profiles and consumer profiles based on user communications includes one or more first computing systems ("clients") 102a, 102b and 102c (generally, 102), a second computing system (a "web/content server", referred to herein as "web server") 104, a third computing system (a "mail server") 106, a fourth computing system (an "ad server") 108, a fifth computing system (a "profile server") 110, and a sixth computing system (a "merchant server") 112. The clients 102, the web server 104, the mail server 106, and the merchant server 112 are in communication with a network 114 using communication channels 116.

For example, the communication channels 116 can connect the clients, 102 to a local-area network (LAN), such as a company intranet, a wide area network (WAN) such as the Internet, and/or other such network 114. The communication channels 116 that allow the clients 102 and the servers 104, 106, 108, 110, and 112 to communicate with the network 114 through the communication channels 116 can be any of a variety of connections including, for example, standard telephone lines, LAN or WAN links (e.g., T1, T3, 56kb, X.25), broadband connections (ISDN, Frame Relay, ATM), and/or wireless connections. The connections can be established using a variety of communication protocols (e.g., HTTP(S), TCP/IP, SSL, IPX, SPX, NetBIOS, Ethernet, RS232, direct asynchronous connections, a proprietary protocol). In one embodiment, the clients 102 and the servers 104, 106, 108, 110, and 112 encrypt some or all communications when communicating with each other or other devices, not shown.

Each of the servers 104, 106, 108, 110, and 112 can be any computing device capable of providing the services requested by the clients 102, such as personal computers, personal data, assistants, and phones. This includes delivering content, media, communications services, and advertisements via the Internet and World Wide Web, as described in more detail below.

For purposes of illustration, FIG. 1 depicts a web server 104 as an entity separate and distinct from the mail server 106, the ad server 108, the profile server 110, and the merchant server 112. The servers 104, 106, 108, 110, and 112 instead can be implemented, for example, on a single server (e.g., as logically distinct modules), distributed on portions of two or more servers, and/or as part of a single server node or server farm in communication with the network 114 through, for example, a single web server (not shown). Even if two logical servers are running in the same physical machine, they may be logically distinct.

Each of the clients 102 can be any computing device (e.g., a personal computer, set top box, wireless mobile phone, handheld device, personal digital assistant, kiosk) used to provide a user interface to access the network 114 and the web server 104. The clients 102 can include one or more input/output devices such as a keyboard, a mouse, a screen, a touch-pad, a biometric input device, etc. The clients 102 also include an operating system such as any member of the WINDOWS family of operating systems from Microsoft Corporation, the MACINTOSH operating system from Apple Computer, and various varieties of Unix, such as SUN SOLARIS from SUN MICROSYSTEMS, and GNU/Linux from RED HAT, INC., for example. The clients 102 also can be implemented on such hardware as a smart or dumb terminal, network computer, wireless device, information appliance, workstation, minicomputer, mainframe computer, or other computing device, that is operated as a general purpose computer or a special purpose hardware device solely used for serving as a client 102 to access the network 114. The clients 102 also may include one or more client-resident applications, such as INTERNET EXPLORER developed by Microsoft Corporation or NAVIGATOR developed by AOL Time Warner Corporation.

As an illustration of how one embodiment of the invention may operate in the environment 100, a user of an electronic communications system ("user") accesses the web server 104 from a client 102a. In some embodiments, access to the web server 104 may be restricted, thus requiring the user to provide a form of personal identification such as a user identifier ("ID"), a password, a secure id, biometric information, or other authentication information uniquely associated with the user. In other embodiments, the user may be a member of the general public visiting a web site hosted on the web server 104 for general public use. The web server 104 may validate that the user has previously registered for the services offered by that web server 104. The web server then grants the user access to some or all of the contents web server 104, the mail server 106, or other services offered by the service. The user may then send and receive electronic communications via the web server 104, the mail server 106, or other communication devices not shown. Such communications may include email, instant messaging, file sharing, voice, video, photographs, audio files, etc. The mail server 106, or other modules used to facilitate communication among users of the service, associates each communication with one or users by assigning a communication to one or more of a sender, to one or more recipients, or to other users referenced in the communication.

The mail server 106 then groups the communications by each user to which a communication is associated, and sends the groups of communications to the profile server 110. The profile server 110 then creates a unique consumer profile for one or more users based on the cumulative content of the communications associated with each user.

The content of the communications associated with a user includes the body text or any of the accompanying information related to an electronic message such as an email, an instant message, or a web log posting. The accompanying information can include information contained in an email header, information contained in the subject line, the addressees of the communication, attachments to the communication, the date the communication was sent, the time the communication was sent, the location from where the communication was sent, type of computer the communication was sent from, or type of service used to compose or deliver the communication.

The user also may request to see a particular page or pages of content from the World Wide Web. The web server 104 delivers the requested content to the client 102a by receiving HTTP requests from the client 102a, compiling the web page or pages from the content provider, and delivering the content to the client 102a. Merchants or content providers may associate one or more offers with a page of content by including the offers for services or products with pages of content. The offers may be in the form of electronic advertisements, known as banner ads, pop-up ads, emails, or other similar offers for goods or services. The offers may be stored, for example, in an ad server 108, which may be managed by a network service provider, by a merchant, or by a third party. Each offer is assigned a unique offer identifier ("offer ID") for use by the web server 104, the ad server 108, the profile server 110, and the merchant server 112. When a user requests a page of content having one or more offers associated with it, the web server 104 determines the offer ID(s) associated with the content page and queries the ad server 108 for the offer(s) identified by the offer ID(s). The web server 104 then sends one integrated Web page including both the requested content and the associated offer(s) to the client 102a.

If a user wishes to inquire about one of the offers presented on the page of Web content or attached to an email in the email footer, the user may select the offer by, for example, navigating a screen pointer to the offer of interest and "clicking" on the offer. This action may open a new display window on the client 102a with more detailed information from the merchant, replace information displayed in the current display window with information from the merchant, or alert the merchant to send additional information to the user. The user may then decide to initiate a transaction with the merchant, continue to browse the additional information provided by the merchant, or return to the originating content page or email. If the user performs some operation representing a meaningful event (such as making a purchase, or some other event as identified as relevant by the merchant), the merchant server 112 captures and stores information associated with the event. In some embodiments, a merchant may deem "no action" by the user as a meaningful event, and therefore captures the non-response of the user. Information associated with the event can include, for example, the amount paid by the user, the products purchased by the user, the user's name, the user's unique user ID, the unique offer identifier for the offer viewed, the date the offer was viewed, the time of day the offer was viewed, the amount of time the offer was viewed, etc. The merchant server 112 then forwards the event information to the profile server 110. The profile server 110 then requests, from the mail server 106 or other communications storage device, some or all of the communications associated with the user ID forwarded from the merchant server 112. The profile server 110 adds some or all of the content contained in the user communications received from the mail server 106 to a collection of the cumulative content of the communications from the other users, each of whom have viewed and responded to the particular offer. The profile server 110 then determines an "offer profile" based at least in part on the cumulative content of the communications.

To create offer profiles, the profile server 110 may use one or more of many document classification techniques known to those skilled in the art. Examples of such techniques include naive Bayesian, centroid-based, k nearest neighbors, CRM114, latent semantic analysis, as well as others.

Once the profile server 110 creates the offer profiles, the profile server 110 may compare offer profiles based on the content of communications from users who previously responded to particular offers to the consumer profiles of other users who request content pages to which the offers are associated. For example, one particular offer profile may show a statistical correlation to a consumer profile associated with a particular user. Thus, the offer associated with that offer profile may have more relevance to the user associated with the consumer profile than other offers. This correlation information can then be sent to the ad server 108, which can in turn determine which offer to show to the user requesting a page of Web content.

Figure 2:
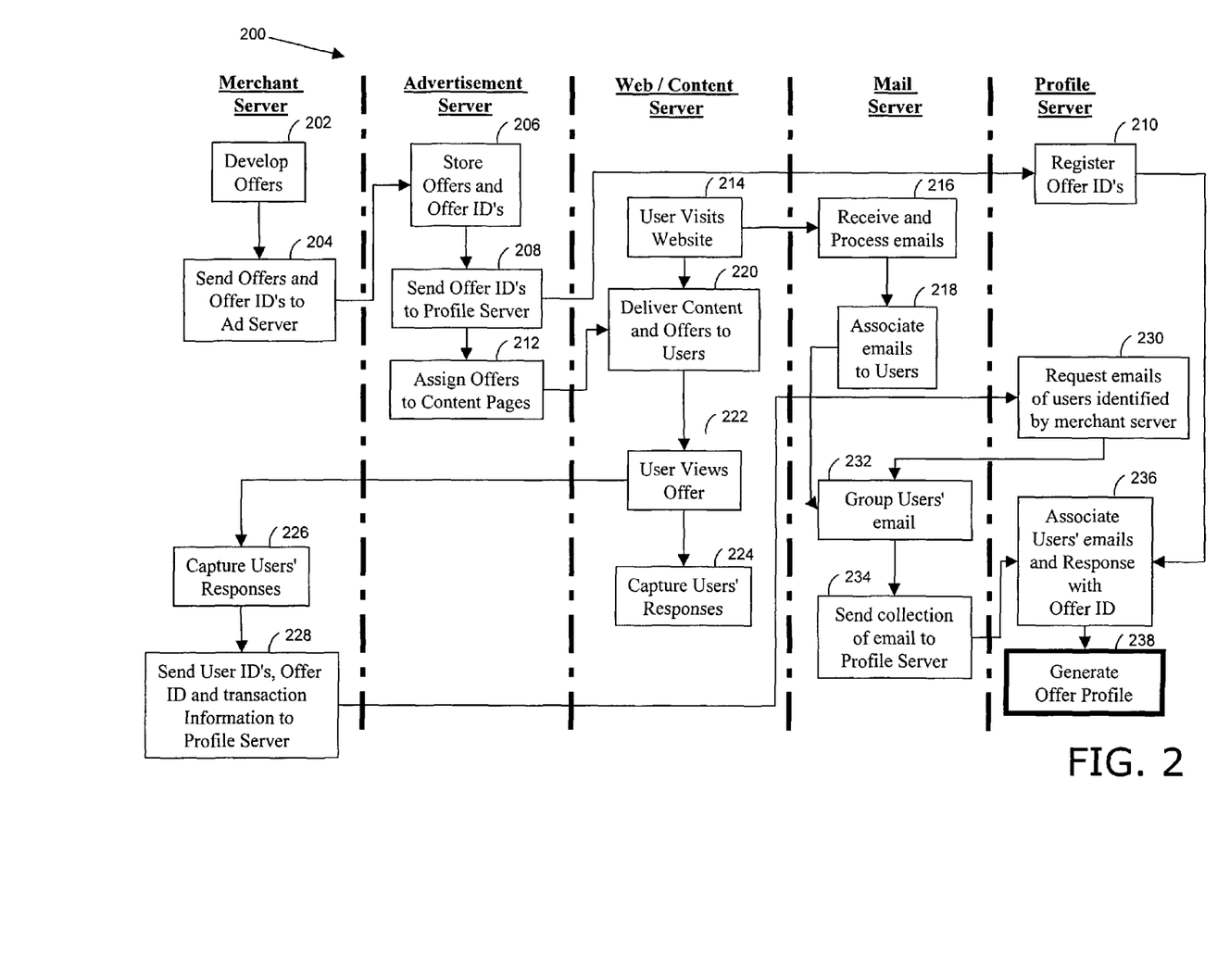
FIG. 2 is a flow diagram of a process to generate offer profiles from communications among users of an electronic communications system, in accordance with an embodiment of the invention.

FIG. 2 illustrates one embodiment of the invention for creating offer profiles based at least in part on the cumulative content of one or more users' electronic communications unrelated to the offer. As previously described, offers may be banner ads included on World Wide Web ("Web") content pages, pop-up ads, emails, footers or headers attached to emails, US Mail, inserts in US Mail, or other advertisements for goods or services. A merchant develops one or more offers (step 202) and assigns a unique offer ID to each offer. Using the merchant server 112 or some other computing device, the merchant sends the offer(s) and the associated offer IDs to an ad server 108 (step 204) where they are stored for future use (step 206). The ad server 108 then sends the offer IDs to the profile server 110 (step 208) where the profile server 110 registers and stores the offer IDs (step 210). The merchant or content provider assigns one or more offers to one or more pages of content using the ad server 108 (step 212), or to one or more emails using the mail server 106, or other computer module (not shown). The merchant assigns the offers to content pages in a one-to-one, one-to-many, or many-to-many fashion.

For example, where the offers are assigned in a many-to-many fashion, the merchant can assign multiple offers to an individual page of content such that a user will not see the same offer when viewing the same page multiple times. Furthermore, the merchant may assign one offer to multiple pages of content such that the same offer may appear on more than one page of content. As an illustration, an airline may create ten distinct offers for discount airfares to ten different destinations, and assign the offers to multiple Web pages within a travel information Web site. Therefore, the first time a user requests a page of information on the Caribbean, the user may see an offer to purchase a discounted airfare ticket to Puerto Rico, and the second time the user requests the same page, the offer may be for the Bahamas. The same user may subsequently request a Web page with information on cruise destinations, and may be shown the same offer for airfare to Puerto Rico.

Referring again to FIG. 2, a user visits a web site (step 214) through the web server 104 by providing the URL for the web site, the IP address for the web site, the keyword for the web site, or some such identifier. The web server 104 may authenticate the user if access to the web site is somehow restricted. The authentication of the user may be through the use of a password, user ID, or some other user identification means. From the web site, the user may perform numerous functions such as requesting content pages, sending email, receiving email, participating in online chat rooms, etc. For example, the user may compose an email on the client 102a, and transmit the email to the mail server 106 for delivery to its recipient(s). The mail server 106 receives the email (step 216), and sends it to the recipient(s) identified by the user. The mail server 106 then associates the email (step 218) with one or more individual users. The mail server 106 may associate the email to the user sending the email. The mail server 106 may associate the email to one or more recipients of the email. The mail server 106 may associate the email to a person mentioned in the body of the email. In some embodiments, the mail server 106 may associate the email to a user referenced in the header of the email.

The user also may request that one or more pages of content be delivered to the client 102a by entering an HTTP address into a location field in an browser application, selecting a saved HTTP address from a list of previously visited locations, or selecting an HTTP link from a Web page. The web server 104 processes the request, and delivers the requested content (step 220) to the client 102a, including offers such as banner advertisements, email footers, or other electronic advertisements as previously described. The user then may view the offers included on the content pages or emails (step 222). The user's response to the offer is then captured by the merchant server 112 (step 226). The user's response may also be captured by the web server 104 (step 224). The user's response to the offer may be any one of selecting one of the offers, not selecting an offer, purchasing a product, calling a phone number, sending an email, or other action deemed by the merchant to be relevant. The merchant server 112 then captures the user's response, and any information related to the user's response (step 226). Related data can include the user's name, the user's unique user ID, the amount the user spent, the products or services the user purchased, the length of time the user viewed the offer, the date the user viewed the offer, the time of date the user viewed the offer, etc.

Once the merchant server 112 determines that one or more users responded to an offer, the merchant server 112 sends the information relating to the response(s) to the profile server 110 (step 228). The merchant server 112 sends the user ID's for the users who responded to the offer, the offer ID of the offer to which the users responded, as well as other information related to the transaction(s). The profile server 110 then requests some or all of the communications associated with the users identified by the merchant server 112 (step 230) from the mail server 106. The mail server 106 then groups all the requested communications (step 232) and sends the collection of communications to the profile server 110 (step 234). The profile server 110 associates the collection of communications with the offer by matching the user IDs sent with the communications to the user IDs and offer IDs sent from the merchant server 112 (step 236). The profile server 110 then creates an offer profile for the offer based at least in part on the cumulative content of some or all the communications associated with the users who responded to the offer (step 238). In some embodiments, the profile server may wait a specified period of time before requesting the emails of the users who responded to the offers. By doing so, the profile server may have a greater number of emails from which to build the profile, or may be able to assign different weights to emails based on, for example, how recently the email was sent, or the particular content page to which the offer was assigned at the time user viewed the offer. Some merchants may not forward information about which users responded to a particular offer. In such cases, offer profiles for similar offers may be used as offer profiles for the particular offer. Similarities my be based, for example, on the product or service being offered, the price at which the product or service is being offered, as well as others.

In one version of the invention, the profile server 110 uses the data relating to the user's response to the offer to further determine the offer profile. For example, the profile server 110 may weight the content from communications sent or received during a particular period (just before viewing the offer, for example) more heavily than communications sent years before viewing the offer. In another example, communications associated with users who purchased goods or services based on viewing an offer may be weighted more heavily than those who only inquired about a product. In other examples, the importance of one subset of communications may be weighted more heavily than a second subset if the first subset of communications are associated with a user who spent over a certain amount of money with the merchant, while the second user did not.

In some embodiments, the determination of whether to use a particular set of communications, or the degree to which they are weighted may not occur instantaneously, and in fact may be determined over a period of time such as a year or more. For example, a credit card company may determine that the relevant information about a particular consumer's response to an offer to sign up for a credit card is not whether the consumer signed up for the card, but whether they are a profitable customer. Such a determination may be based on the amount of money the consumer spends on the card, the degree to which they pay their bill, or other such measures. In these cases, the communications for such a user may not be used to formulate the offer profile for the credit card until such information can be amassed by the card issuer.

Figure 3:
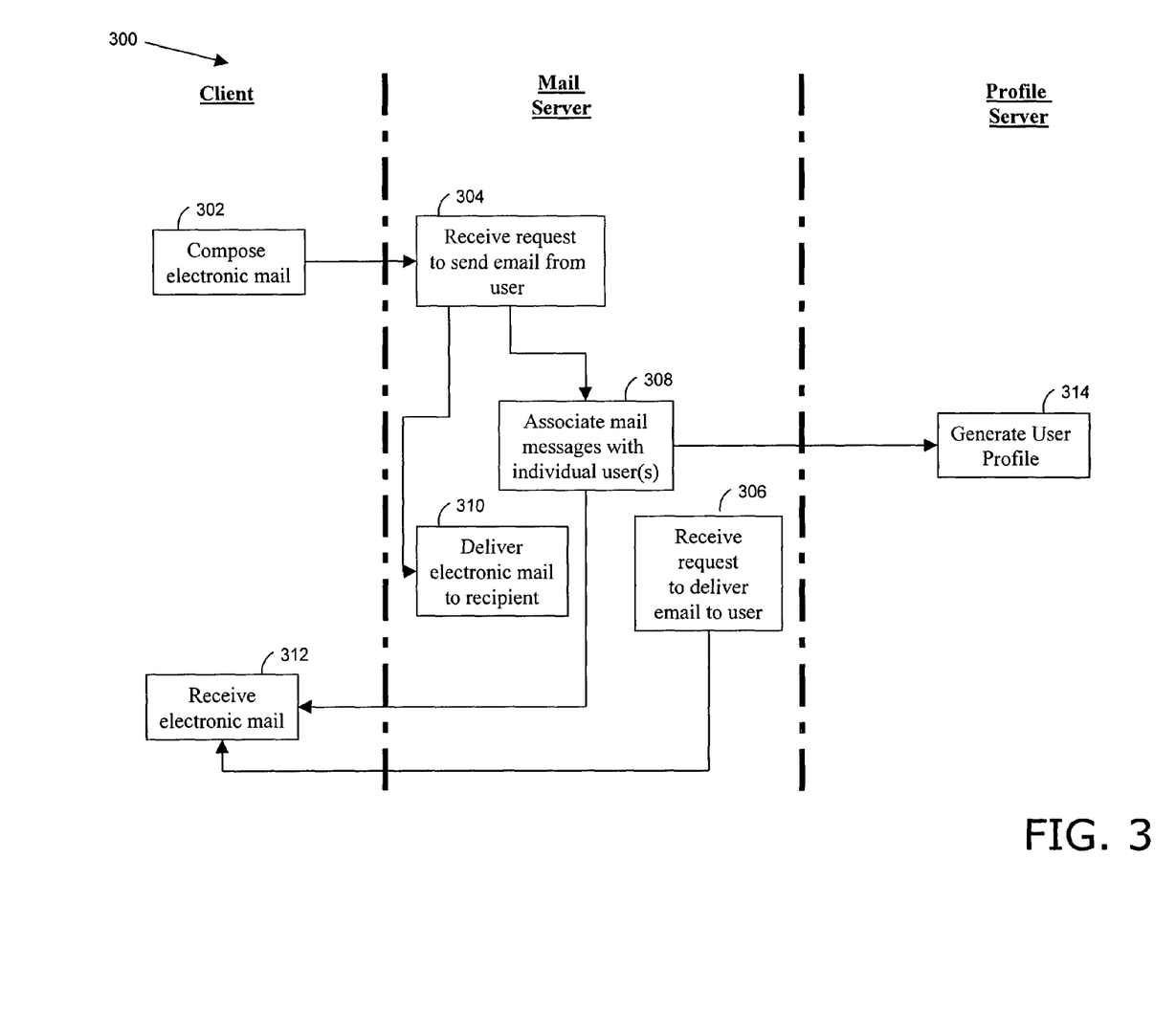
FIG. 3 is a flow diagram of a process to create consumer profiles based on the cumulative content of communications associated with a user of an electronic communications system, in accordance with an embodiment of the invention.

FIG. 3 illustrates one embodiment of the invention for creating consumer profiles for users of an electronic communications system. Upon visiting the web site of a provider of such a system, a user may compose various forms of electronic communications, such as emails, instant messages, voicemails, online chat, etc. (step 302). Typically, each communication has a sender and one or more recipients. Upon receiving a request to route a communication from a user (step 304), the mail server 106 (or similar server for processing and routing communications) associates the communication with each of the senders and recipients (step 308). The mail server 106 then delivers the email to the intended recipient (step 310). The user operating the client 102 may also be identified as a recipient of an email message, such that the mail server 106 receives a request to deliver an email to the user (step 306). In such cases the mail server 106 forwards the email to the user and the client 102 receives the email message (step 312). The mail server 106 then sends the collection of communications to the profile server 110 which generates a consumer profile (step 314) for one or more of the users based on the cumulative content of some or all of the communications associated with each user.

Figure 4:
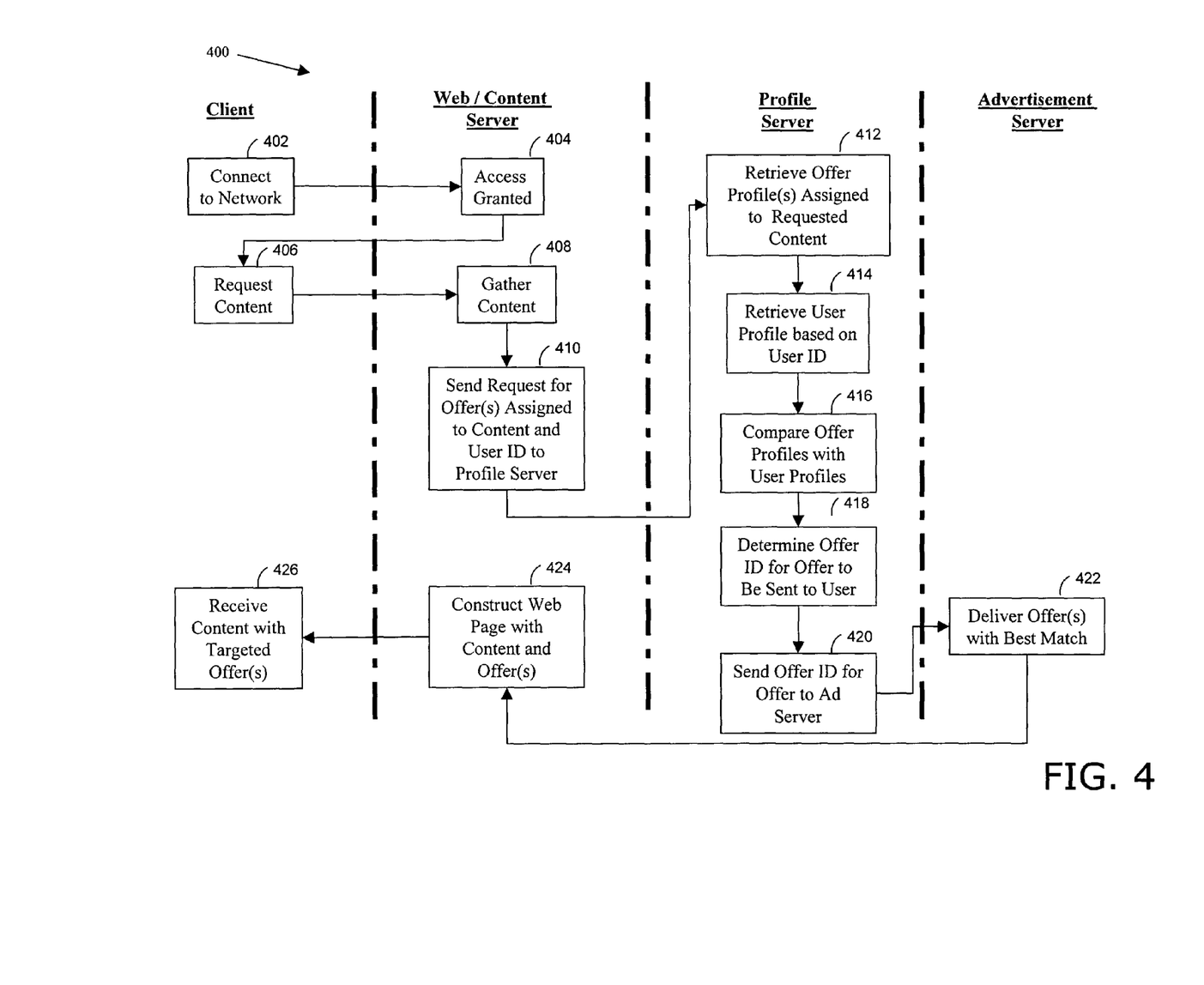
FIG. 4 is a flow diagram of a process to deliver targeted offers to users of an electronic communications system by comparing offer profiles and consumer profiles based on the user communications, in accordance with an embodiment of the invention.

FIG. 4 illustrates one embodiment of the invention for determining if one particular offer out of a set of offers is more appropriate to send to a particular user. A user of an electronic communications system accesses the web server 104 from a client 102*a*. In some embodiments, access to the web server 104 may be restricted, thus requiring the user to provide a form of personal identification such as a user identifier ("ID"), a password, a secure id, biometric information, or other authentication information uniquely associated with the user. The web server 104 may validate that the user has previously registered for the services offered by that web server 104. The web server then grants the user access to some or all of the contents web server 104, the mail server 106, or other services offered by the service (step 404). The user then requests pages of Web content (step 406) to be sent to their client machine 102*a* by entering an HTTP address into a web browser, by clicking on an HTTP link on a web page, or other means of navigating to a particular Web page. The web server 104 receives the request and gathers the content (step 408) requested by the user, either from its own stored content or from other web servers (not shown). If the requested content page contains instructions to include one or more offers, the web server 104 sends both the user ID of the user (or other means of identifying the user) requesting the page and the offer IDs for the offers that are associated with the requested page to the profile server 110 (step 410). The profile server 110 retrieves the offer profiles for each of the associated offers, (step 412) and the consumer profile for the user requesting the page (step 414). The profile server 110 then compares one or more of the retrieved offer profiles to the retrieved consumer profile (step 416). The profile server 110 identifies which offer profile is most similar to the consumer profile (step 418) and sends the offer ID (step 420) corresponding to the identified offer profile to the ad server 108. The ad server 108 retrieves the offer associated with the offer ID, and sends the offer to the web server 104 (step 422). The web server 104 then constructs the web page using the selected offer, (step 424) and forwards the completed page to the client machine 102*a* for viewing by the user (step 426). In one embodiment, the ad server 108 maintains a historical record of the offers viewed by a user. In such cases, the ad server 108 retrieves an alternate offer other than the offer corresponding to the offer profile that is most similar to the consumer profile. In some embodiments, multiple offers are identified as similar to the consumer profile of the user, and the ad server 108 randomly selects one of the offers inclusion on the web page or email being sent to the user.

Figure 5:
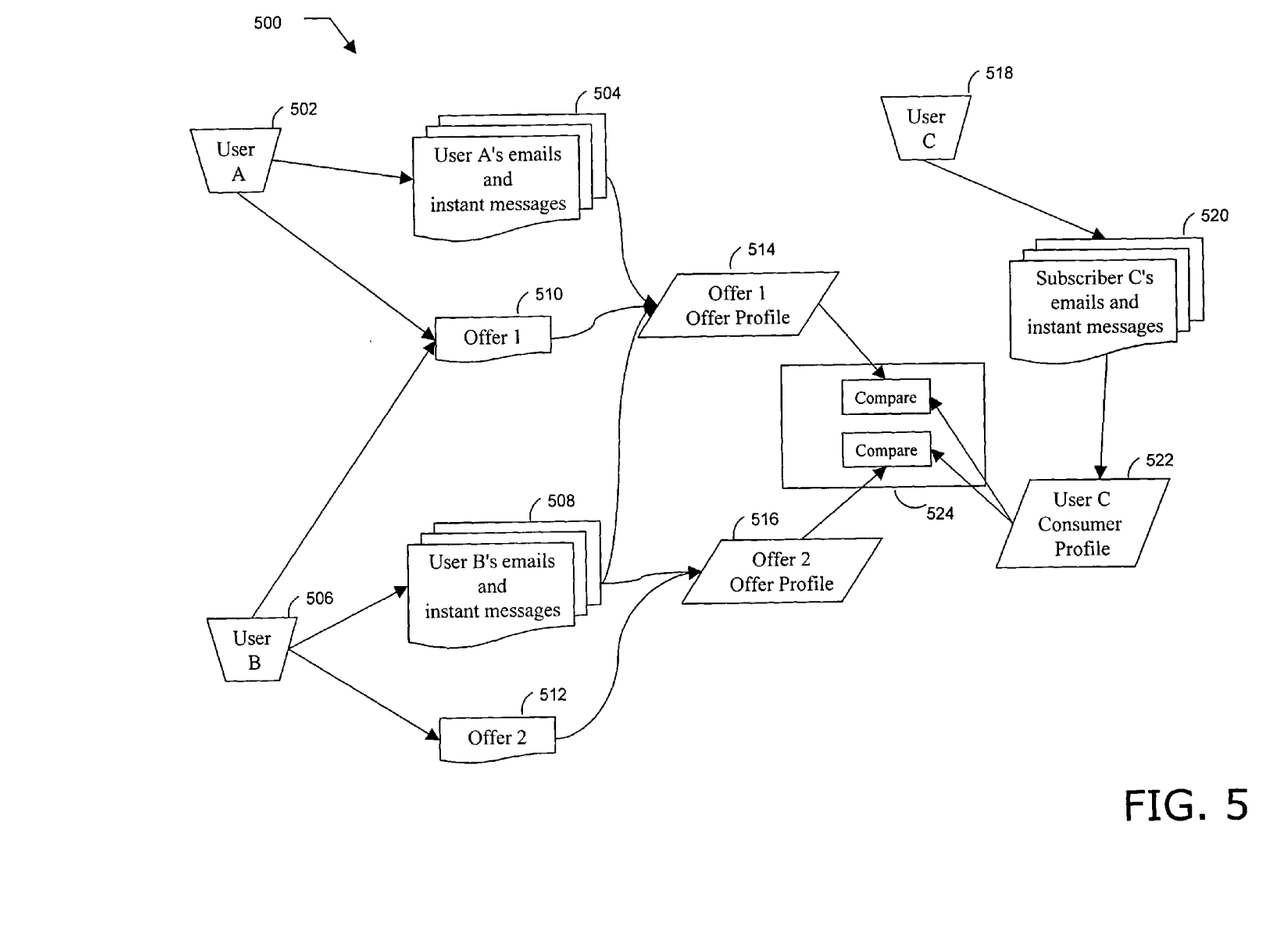
FIG. 5 shows the delivery of targeted offers to users of an electronic communications system by comparing offer profiles and consumer profiles based on user communications, in accordance with an embodiment of the invention.

FIG. 5, further illustrates one preferred embodiment of the invention. User A 502 has previously sent or received forty email messages, and sixty instant messages for a total of one hundred communications 504. The collection of one hundred communications 504 is associated with user A 502. User B 506 has sent or received twenty email messages and thirty instant messages for a total of fifty communications 508. The collection of fifty communications 508 is associated with user B 506. Upon requesting a page of Web content, user A 502 and user B 506 are shown two offers, offer 1, 510, and offer 2, 512. User A 502 responds positively to offer 1, 510, and user B 506 responds positively to both offer 1, 510, and offer 2, 512. The one hundred communications 504 associated with user A 502 are assigned only to offer 1, 510, while the fifty communications 508 associated with user B 506 are assigned both to offer 1, 510, and to offer 2, 512. As a result, the collection of one hundred and fifty communications (504 and 508) associated with user A 502 and user B 506 are grouped together into one collection of communications and associated with offer 1 510. The profile server 110 then creates an offer profile 514 for offer 1 510 based on the cumulative content of the communications (504 and 508) from user A 502 and user B 506. The profile server 110 may also create an offer profile 516 for offer 2 512 based solely on the cumulative content of the communications 508 from user B 506. As mentioned above, in one version of the invention the profile server 110 may weight the communications 504 from user A 502 more heavily than the communications 508 associated with user B 506 based on user A's 502 response to offer 1, 510. In one embodiment, the each communication is stored in its entirety on, for example, the mail server 106. In another embodiment, in cases where the communications are large or too numerous, only a portion of the communications are stored on the profile server 110, for example. In another embodiment, a statistical representation of the communications are stored on, for example, the profile server 110.

Continuing with the example above, a third user, user C 518, has previously sent or received twenty emails and forty instant messages, collectively 520. According to the method 300 described above, the profile server 110 builds, or has previously built a consumer profile 522 based on the content of the sixty communications 520 associated with user C 518. Further, offers 1, 510, and 2, 512, have been associated with a particular page of Web content such that the web server 104 will include either offer 1, 510, or offer 2, 512, but not both, when a user requests the page. When user C 518 requests the page of content with which offers 1, 510, and 2, 512, are associated, a comparison engine 524 compares the consumer profile 522 for user C 518 with the offer profile 514 for offer 1, 510, and the offer profile 516 for offer 2, 512. If, for example, the offer profile 514 for offer 1, 510, which is based at least in part on the content of communications (504 and 508) from user A 502 and user B 506, is a closer match that the offer profile 516 for offer 2, 512, which is based only on the content of communications 508 from user B 506, offer 1, 510, is included on the page of content and sent to the client 102a. As user A 502, user B 506, and user C 518 send additional communications such as emails and/or instant messages, the new communications are added to the collections for each user, collection 504, collection 508, and collection 520, for users A 502, B 506, and C 518, respectively. As the collections grow, the consumer profiles (profile 522 for user C 518, for example) become more reflective of which offers are more likely to be shown to a user. In addition, as user A 502 and user B 506 generate additional communications, their communications are added to the collections of communications associated with offers to which they have responded.

As a further illustration of the example above, user B 506 may be an avid golfer, and the work "golf" may appear in the collection of communications 508 associated with user B 506 more often than the word "golf" appears in a typical collection of communications from a random member of the general public. Therefore, using the example above, when user B 506 responds to offer 2, 512, the word "golf" will appear in the collection of communications for offer 2 512 and would impact the offer profile 516 for offer 2, 512. However, because user A 502 did not respond to offer 2, 512, and the collection of communications 504 from user A 502 does not contain the word "golf" any more frequently than would a set of communications from a member of the general public, the collection of communications for offer 1, 514, does not contain the word "golf" as frequently as does the collection of communications (504 and 508) for offer 2, 512.

Further, user C 518 may also be an avid golfer, and therefore the collection of communications 520 associated with user C 518 may contain the word "golf" more frequently than would a collection of communications associated with a member of the general public. As described above, the consumer profile 522 for user C 518 would reflect her above-average use of the word "golf" in her communications. Therefore, when user C 518 requests a page of web content to which offers 1 and 2 (510 and 512 respectively) are assigned, the comparison engine 524 recognizes a similarity between the offer profile 516 for offer 2, 512 and the consumer profile 522 for user C, 518, and therefore offer 2 512 is shown to user C 518.

Figure 6:
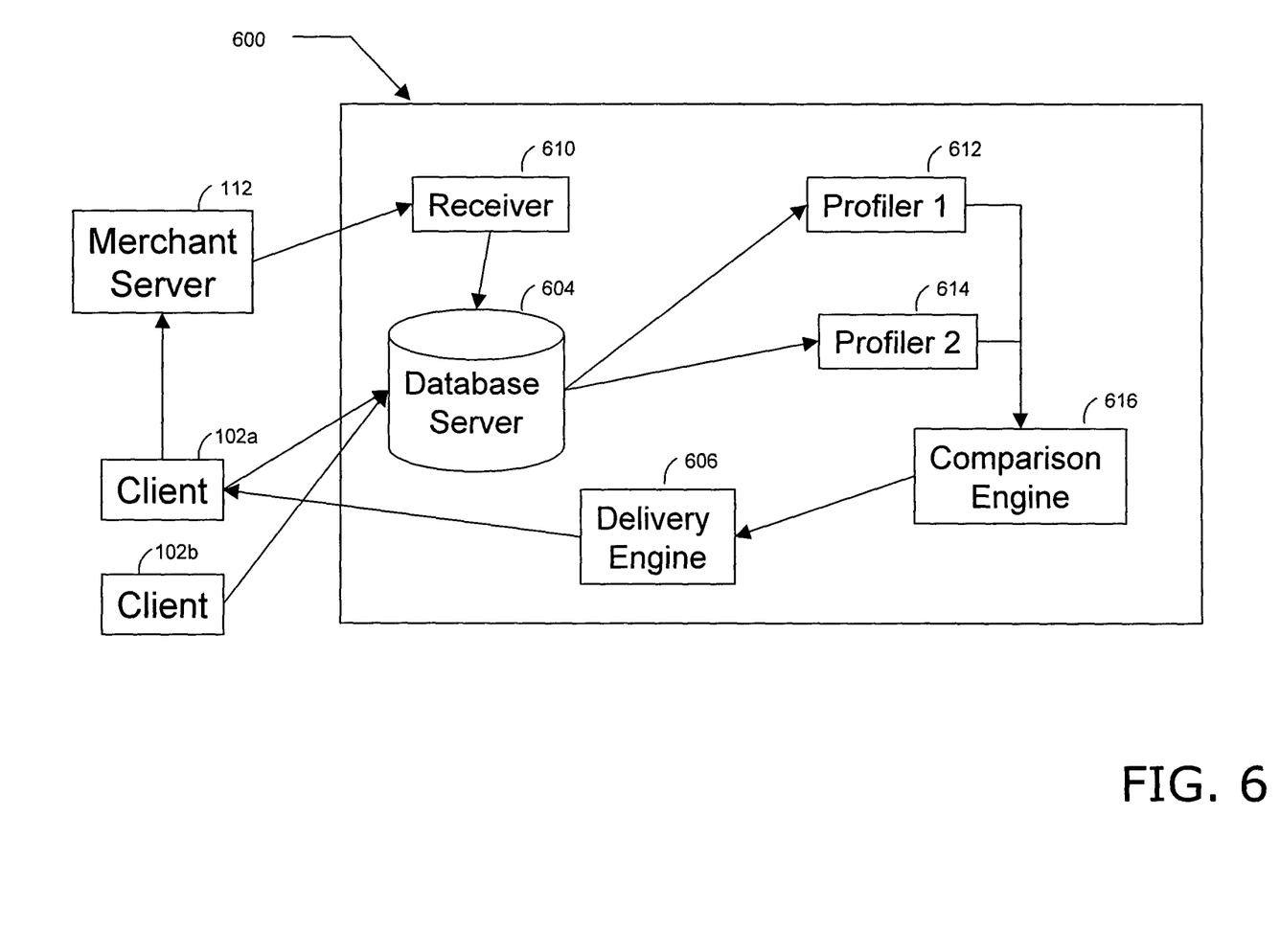
FIG. 6 is a diagram of a system that facilitates the delivery of targeted offers to users of an electronic communications system by comparing offer profiles and consumer profiles based on user communications, in accordance with an embodiment of the invention.

FIG. 6, illustrates one embodiment of a system 600 for delivering target offers to users of an electronic communications system in accordance with the invention. A first user of an electronic communications system such as an email service, voicemail service, bulletin board, or the like, logs into the system 600 from a client 102a by providing authentication information such as a user ID, password, or similar data. While logged in, the first user may generate electronic communications such as emails, instant messages, or similar messages. These messages may be stored in a database server, 604. In addition, while logged into the system 600 the first user may request World Wide Web content pages, with which one or more offers may be associated. In response to such a request, a delivery engine 606 delivers the content and associated offers to the client 102a. Once the first user views the content and any associated offers, the first user may decide to inquire about one of the offers by, for example, clicking on an electronic advertisement offered by a merchant. If the merchant determines the first user's interaction warrants capturing, the merchant captures information about the first user's interaction in the merchant server 112. The merchant server then sends the information about the first user's response to the offer to a receiver, 610.

Continuing with the above example, the receiver 610 transmits information about the first user's interaction with an offer to the database server 604, and to a first profiler 612. The first profiler 612 then requests the communications associated with the first user, as well as the communications associated with other users who also responded to the same offer, from the database server 604. The first profiler 612 then creates an offer profile based at least in part on the cumulative content of the communications associated with the set of users, including the first user, who responded to the offer. The first profiler 612 then sends the offer profile to the database server 604 where it is stored for future use.

A second user then logs into the system 600 from a client 102b and generates electronic communications such as emails, instant messages, or similar messages which are stored in the database server, 604. A second profiler 614 requests the communications associated with the second user and creates a consumer profile for the second user based at least in part on the cumulative content of the communications associated with the second user and sends the consumer profile for the second user to the database server 604. When the second user requests a page of Web content having multiple offers associated with it, a comparison engine 616 requests the offer profiles for the associated offers and the consumer profile for the second user from the database server 604. The comparison engine 616 then determines which offer is most relevant to the second user based on the similarity between the second user's consumer profile and the offer profiles.

For embodiments in which the invention is provided as software, the program may be written in any one of a number of high level languages such as FORTRAN, PASCAL, JAVA, C, C++, or BASIC. Additionally, the software could be implemented in an assembly language directed to the microprocessor resident on the target computer, for example, the software could be implemented in Intel 80x86 assembly language if it were configured to run on an IBM PC or PC clone. The software may be embodied on an article of manufacture including, but not limited to, a floppy disk, a hard disk, an optical disk, a magnetic tape, a PROM, an EPROM, EEPROM, field-programmable gate array, or CD-ROM.

In these embodiments, the software may be configured to run on any personal-type computer or workstation such as a PC or PC-compatible machine, an Apple Macintosh, a Sun workstation, etc. In general, any device could be used as long as it is able to perform all of the functions and capabilities described herein. The particular type of computer or workstation is not central to the invention.

The computer typically will include a central processor, a main memory unit for storing programs and/or data, an input/output (I/O) controller, a display device, and a data bus coupling these components to allow communication therebetween. The memory includes random access memory (RAM) and read only memory (ROM) chips. The computer typically also has one or more input devices such as a keyboard (e.g., an alphanumeric keyboard and/or a musical keyboard), a mouse, and, in some embodiments, a joystick.

The computer typically also has a hard drive with hard disks therein and a floppy drive for receiving floppy disks such as 3.5 inch disks. Other devices also can be part of the computer including output devices (e.g., printer or plotter) and/or optical disk drives for receiving, writing and reading digital data on a CD-ROM. In the disclosed embodiment, one or more computer programs define the operational capabilities of the system, as mentioned previously. These programs can be loaded onto the hard drive and/or into the memory of the computer via the floppy drive, CD-ROM, or other like device. In general, the controlling software program(s) and all of the data utilized by the program(s) are stored on one or more of the computer's storage mediums such as the hard drive, CD-ROM, etc. In general, the programs implement the invention on the computer, and the programs either contain or access the data needed to implement all of the functionality of the invention on the computer.

Variations, modifications, and other implementations of what is described herein may occur to those of ordinary skill without departing from the spirit and scope of the invention. Accordingly, the invention is not to be defined only by the preceding illustrative description.

What is claimed is:

1. A computer-implemented method of determining relevance of offers to consumers, the method comprising:
   (a) providing a profile server, the profile server configured to:
      (i) construct a plurality of offer profiles, each of the offer profiles associated with an offer and based at least in part on statistical properties of consumer communications unrelated to the offer, a subset of the consumer communications being associated with consumers to which the offers were previously sent;
      (ii) construct a plurality of consumer profiles, each of the consumer profiles associated with a consumer and based on statistical properties of communications associated with the respective consumer; and
      (iii) determine a relevancy of one of the offers to one of the consumers by comparing the offer profiles associated with the offers to a consumer profile associated with the consumer; and
   (b) a web server, the web server configured to present one or more of the offers to the consumer based at least in part on the determined relevancy.

2. The method of claim 1 further comprising, prior to step a), sending, via an email server, the at least one of the offers to at least one of the consumers.

3. The method of claim 2 further comprising, prior to step a), receiving via an email server, information about a response to one of the offers by one of the consumers to whom the offer was sent.

4. The method of claim 3 further comprising basing the offer profiles at least in part on the received information.

5. The method of claim 4 further comprising attributing a weighting factor to the at least one communication unrelated to the offer, the weighting factor being reflective of the received information, and being based at least in part on a consumer's response to the offer.

6. The method of claim 1 wherein the at least one of the communications unrelated to the offer comprises an electronic communication.

7. The method of claim 6 wherein the electronic communication comprises at least one of an email message, an instant message, or voice.

8. The method of claim 1 wherein at least one of the communications associated with the consumer comprises an electronic communication.

9. The method of claim 8 wherein the electronic communication comprises at least one of an electronic mail message, an instant message, or voice.

10. The method of claim 1 wherein at least one of the offers comprises an advertisement.

11. The method of claim 1 wherein the statistical properties comprise text use frequency statistics of the communications.

12. A system for determining relevance of offers to users of an electronic communications system, the system comprising:
   a) a first profile server for determining an offer profile for an offer based at least in part on statistical properties of communications unrelated to the offer, a subset of the communications being associated with consumers to which the offer was previously sent;
   b) a second profile server for determining a consumer profile for a user of the electronic communications system, the consumer profile based at least in part on statistical properties of electronic communications associated with the users of the electronic communications system; and
   c) a comparison engine for comparing the offer profile to the consumer profile to determine the relevance of the offer to the user.

13. The system of claim 12 further comprising a delivery engine for delivering one or more offers to the users of the electronic communications system.

14. The system of claim 13 further comprising a receiver for receiving information about a response to one of the offers to one of the users of the electronic communications system.

15. The system of claim 14 wherein the first profile server is further configured to assign a weighting factor to a communication unrelated to the offer, the weighting factor reflective of the received information and being based at least in part on the user's response to the offer.

16. The system of claim 12 further comprising a database server for storing at least one of the offer, the offer profile, the consumer profile, the information about a response by a user of the electronic communications system to the one or more offers delivered to the user of the electronic communications system, and the electronic communication.

17. The system of claim 12 further comprising a communications server for facilitating communications among the users of the electronic communications system.

18. The system of claim 12 wherein the statistical properties comprise text use frequency statistics of the communications.

* * * * *